United States Patent
Motamedhashemi

(10) Patent No.: US 10,316,376 B2
(45) Date of Patent: Jun. 11, 2019

(54) METHODS AND SYSTEMS FOR INCREASING THE CARBON CONTENT OF SPONGE IRON IN A REDUCTION FURNACE

(71) Applicant: Mirmohammadyousef Motamedhashemi, Charlotte, NC (US)

(72) Inventor: Mirmohammadyousef Motamedhashemi, Charlotte, NC (US)

(73) Assignee: Midrex Technologies, Inc., Charlotte, NC (US)

(*) Notice: Subject to any disclaimer, the term of this patent is extended or adjusted under 35 U.S.C. 154(b) by 201 days.

(21) Appl. No.: 14/748,413

(22) Filed: Jun. 24, 2015

(65) Prior Publication Data
US 2017/0058373 A1    Mar. 2, 2017

(51) Int. Cl.
*C01B 3/02* (2006.01)
*C01B 3/50* (2006.01)
(Continued)

(52) U.S. Cl.
CPC ............ *C21B 13/0073* (2013.01); *C01B 3/02* (2013.01); *C01B 3/50* (2013.01); *C21B 13/0086* (2013.01); *C21B 13/02* (2013.01); *C21B 13/146* (2013.01); *F27D 17/004* (2013.01); *C21B 2100/22* (2017.05); *C21B 2100/282* (2017.05);
(Continued)

(58) Field of Classification Search
CPC ....... C22B 13/0073; C22B 13/02; C01B 3/02; C01B 3/50; C01B 31/18; F27D 17/004
See application file for complete search history.

(56) References Cited

U.S. PATENT DOCUMENTS

| | | | |
|---|---|---|---|
| 2,547,685 A | 4/1951 | Brassert et al. | |
| 2,653,088 A | * 9/1953 | Pike | .................... C21B 13/0073 75/500 |

(Continued)

FOREIGN PATENT DOCUMENTS

| | | |
|---|---|---|
| DE | 19538591 C1 | 4/1997 |
| DE | 19838368 C1 * | 8/1999 ......... C21B 13/0086 |

(Continued)

OTHER PUBLICATIONS

Miyashita et al. JP 2000219509 A published Aug. 2000. Machine translation.*

(Continued)

*Primary Examiner* — Tima M McGuthry-Banks
(74) *Attorney, Agent, or Firm* — Clements Bernard Walker PLLC; Christopher L. Bernard

(57) ABSTRACT

Methods and systems for producing direct reduced iron having increased carbon content, comprising: providing a reformed gas stream from a reformer; delivering the reformed gas stream to a carbon monoxide recovery unit to form a carbon monoxide-rich gas stream and a hydrogen-rich gas stream; and delivering the carbon-monoxide-rich gas stream to a direct reduction furnace and exposing partially or completely reduced iron oxide to the carbon monoxide-rich gas stream to increase the carbon content of resulting direct reduced iron. The carbon monoxide-rich gas stream is delivered to one of a transition zone and a cooling zone of the direct reduction furnace. Optionally, the method further comprises mixing the carbon monoxide-rich gas stream with a hydrocarbon-rich gas stream.

13 Claims, 2 Drawing Sheets

(51) Int. Cl.
  *C21B 13/00* (2006.01)
  *C21B 13/02* (2006.01)
  *F27D 17/00* (2006.01)
  *C21B 13/14* (2006.01)

(52) U.S. Cl.
  CPC ...... *C21B 2100/42* (2017.05); *C21B 2100/60* (2017.05); *Y02P 10/122* (2015.11); *Y02P 10/126* (2015.11); *Y02P 10/128* (2015.11); *Y02P 10/136* (2015.11)

(56) References Cited

U.S. PATENT DOCUMENTS

| | | | | |
|---|---|---|---|---|
| 3,748,120 A | * | 7/1973 | Beggs et al. | C21B 13/0073 252/373 |
| 3,765,872 A | * | 10/1973 | Celada | C21B 13/0073 252/373 |
| 4,019,724 A | | 4/1977 | Cruse et al. | |
| 4,054,444 A | | 10/1977 | Clark et al. | |
| 4,150,972 A | * | 4/1979 | Price-Falcon | C21B 13/0073 75/494 |
| 4,159,201 A | * | 6/1979 | Staege | C01B 3/38 423/224 |
| 4,224,057 A | | 9/1980 | Martinez-Vera et al. | |
| 4,268,303 A | | 5/1981 | Kaneko et al. | |
| 4,337,170 A | * | 6/1982 | Fuderer | B01J 8/062 252/373 |
| 4,584,016 A | | 4/1986 | Becerra-Novoa et al. | |
| 4,702,766 A | * | 10/1987 | Love | C21B 13/02 266/80 |
| 4,734,128 A | | 3/1988 | Becerra-Novoa et al. | |
| 4,752,329 A | * | 6/1988 | Freeland | C21B 13/02 266/80 |
| 4,854,967 A | | 8/1989 | Hauk | |
| 4,880,459 A | * | 11/1989 | Coyne, Jr. | C21B 13/0073 266/155 |
| 5,112,590 A | * | 5/1992 | Krishnamurthy | B01D 53/047 422/187 |
| 5,437,708 A | * | 8/1995 | Meissner | C21B 13/02 266/140 |
| 5,618,032 A | * | 4/1997 | Meissner | C21B 13/02 266/80 |
| 6,120,926 A | * | 9/2000 | Szydlowski | B01J 8/02 429/425 |
| 6,355,088 B1 | * | 3/2002 | Greenwalt | C21B 13/0086 75/436 |
| 7,731,923 B2 | * | 6/2010 | Marty | B01D 53/04 252/373 |
| 8,709,128 B2 | | 4/2014 | Knop et al. | |
| 9,028,720 B1 | * | 5/2015 | Repasky | C01B 3/386 252/373 |
| 2001/0008621 A1 | * | 7/2001 | Christensen | C01B 3/382 423/418.2 |
| 2002/0050097 A1 | | 5/2002 | Fournier et al. | |
| 2013/0129589 A1 | * | 5/2013 | Heisel | B01D 53/002 423/224 |
| 2013/0312571 A1 | * | 11/2013 | Metius | C21B 13/02 75/488 |
| 2016/0039670 A1 | * | 2/2016 | Oelmann | C01B 3/382 252/373 |

FOREIGN PATENT DOCUMENTS

| | | | |
|---|---|---|---|
| EP | 0179734 A2 | | 4/1986 |
| JP | 58071314 | * | 4/1983 |
| JP | 58-139794 A | | 8/1983 |
| JP | 2000219509 A | * | 8/2000 |

OTHER PUBLICATIONS

DE 19838368 C1 machine translation. (Year: 1999).*
DE 19838368 C1 written translation (original document published Aug. 12, 1999).*
JP 58071314 machine translation of the description. (Year: 1983).*
Sep. 29, 2015 International Search Report issued in International Patent Application No. PCT/US2015/038325.

* cited by examiner

US 10,316,376 B2

METHODS AND SYSTEMS FOR INCREASING THE CARBON CONTENT OF SPONGE IRON IN A REDUCTION FURNACE

FIELD OF THE INVENTION

The present invention relates generally to methods and systems for increasing the carbon content of sponge iron in a direct reduction (DR) furnace.

BACKGROUND OF THE INVENTION

Direct reduced iron (DRI), which is also referred to as sponge iron, is typically produced by the reaction of iron ore in a reactive gas stream containing reducing agents, such as $H_2$ and CO, in a moving bed or vertical shaft reactor. The following are the equilibrium-limited global reactions:

$$Fe_2O_3 + 3H_2 \Leftrightarrow 2Fe + 3H_2O \quad (1)$$

$$Fe_2O_3 + 3CO \Leftrightarrow 2Fe + 3CO_2 \quad (2)$$

In commercial DR processes, the product DRI still contains unreacted iron oxide, which may be as high as 15.0% by weight. Due to the equilibrium-limited nature of reactions (1) and (2), it is not economical to achieve complete (i.e. 100.0%) reduction within the reduction reactor. In fact, when the degree of reduction approaches 100.0%, an excessively long residence time inside the reduction reactor is required to remove the remaining oxygen from the partially reacted material. While the rate of reduction reactions can be increased to some extent by increasing temperature, such temperature increases are limited by the fact that the operating temperature must be kept below the sintering temperature so that clusters are not formed inside the reduction reactor. Thus, the typical reduction is maintained somewhere in the 85.0-95.0% range at the discharge of conventional commercial reduction reactors, depending on the quality of the oxide material and plant operating conditions.

Such product DRI can be used as a source of low-residual iron, in addition to ferrous scrap and pig iron in the production of steel, mainly through an electric arc furnace (EAF) in a steelmaking facility. The EAF melts that charged material by means of an electric arc, typically accompanied by the injection of oxygen in order to burn impurity carbon and $Fe_3C$, if any. The partial or complete combustion of the carbon with oxygen provides a uniform internal source of energy for the EAF when the oxygen is injected into the EAF. Furthermore, the conversion of $Fe_3C$ into iron and carbon is an exothermic reaction, which improves the thermal efficiency of the EAF. Therefore, the carbon content of the DRI can be interpreted as an energy source, and this energy is finally utilized in the EAF when the DRI is melted.

Although other carbon sources, like coal or rubber, can be added to the EAF for the same purpose, the resulting yield is significantly less than the combined carbon in the DRI, due to particle blow-off and impurities in the carbon sources. Therefore, it is highly desirable to increase the carbon content of DRI during the reduction step before discharging it into the EAF.

Inside the reduction reactor, carbon can be generated (i.e. physical carbon-C) or added to the DRI (i.e. chemical carbon-$Fe_3C$) through the following global reactions:

$$3Fe + CO + H_2 \Leftrightarrow Fe_3C + H_2O \quad (3)$$

$$3Fe + 2CO \Leftrightarrow Fe_3C + CO_2 \quad (4)$$

$$3Fe + CH_4 \Leftrightarrow Fe_3C + 2H_2 \quad (5)$$

$$CO + H_2 \Leftrightarrow C + H_2O \quad (6)$$

$$2CO \Leftrightarrow C + CO_2 \quad (7)$$

$$CH_4 \Leftrightarrow C + 2H_2 \quad (8)$$

Therefore, two major sources of combined carbon in product DRI (i.e. physical and chemical) are CO and hydrocarbons (e.g. $CH_4$) in the reducing gas stream. While the amount of CO in the reducing gas stream is normally set by the operating conditions of the reducing gas generation unit, the amount of hydrocarbons is adjusted by the operator to suppress methanation reactions inside the reduction furnace, while considering the cooling effects caused by:

Endothermic reactions (5) and (8) above,
Endothermic reforming reactions (13) and (14) below catalyzed by iron within the reduction reactor,
Direct heat removal by the hydrocarbons, which have noticeably higher heat capacities as compared to most of the gases in a DR plant, and
Limited preheat temperatures for hydrocarbon streams (below ~400 degrees C.).

In other words, from an operational point of view, there are limitations to increasing the amounts of CO and $CH_4$ in the reducing gas stream.

One of the commercially practiced approaches for bypassing these limitations is the addition of a hydrocarbon-rich stream to the bulk of the already reduced materials. This is usually done by injecting natural gas into the hot reduced material (a good catalyst) once it leaves the reduction zone—a region typically called the transition zone. Thus, due to cracking reactions in the transition zone, the carbon content of the product increases.

Due to the endothermic nature of the cracking reactions, this interaction lowers the material and gas temperatures, thus helping to cool the product DRI. However, this cooling effect for plants where the DRI has to leave the reduction furnace at elevated temperatures, is viewed as a negative side effect, and is typically minimized.

In commercialized DR processes, a hydrocarbon source is normally utilized to produce the reducing agents via a catalytic or non-catalytic reforming process. For catalytic reforming processes, the required oxidants are typically $H_2O$ (i.e. steam) and $CO_2$. For non-catalytic reforming processes, the required oxidant is typically oxygen ($O_2$). In the latter case, very fast partial and complete combustion reactions generate $H_2O$ and $CO_2$ for further homogeneous and/or heterogenous reforming reactions. All reforming processes convert some portion of the carbon and hydrogen contents of the hydrocarbons into CO and $H_2$, respectively. For instance, in the case of $CH_4$ being the only hydrocarbon source, the global reaction schemes governing the homogenous and heterogenous reforming processes are:

$$CH_4 + 2O_2 \Leftrightarrow CO_2 + 2H_2O \quad (9)$$

$$CH_4 + 1.5O_2 \Leftrightarrow CO + 2H_2O \quad (10)$$

$$CH_4 + O_2 \Leftrightarrow CO + H_2 + H_2O \quad (11)$$

$$CH_4 + 0.5O_2 \Leftrightarrow CO + 2H_2 \quad (12)$$

$$CH_4 + H_2O \Leftrightarrow CO + 3H_2 \quad (13)$$

$$CH_4 + CO_2 \Leftrightarrow 2CO + 2H_2 \quad (14)$$

The gas leaving the reforming process is therefore a mixture of CO, $H_2$, and unreacted hydrocarbons and oxidants, and is called the reformed gas.

Alongside these main reactions, depending on the thermodynamics of the system, some of the previously mentioned reactions can also occur, the major of which are:

$$CO+H_2 \Leftrightarrow C+H_2O \quad (6)$$

$$2CO \Leftrightarrow C+CO_2 \quad (7)$$

$$CH_4 \Leftrightarrow C+2H_2 \quad (8)$$

The resulting carbon from these side reactions creates detrimental consequences for the reforming catalyst, and, therefore, it is a common practice to prevent their occurrence by controlling the operating parameters of the reformer unit.

Based on reactions (1) and (2), the presence of oxidants $H_2O$ and $CO_2$ in the reducing gas mixture reduces the efficiency of the reduction reactions. Consequently, operating parameters in the reforming section of the plant are adjusted in such a way that the reformed gas has high values of $CO/CO_2$ and $H_2/H_2O$, which can be achieved by a high conversion rate for $CH_4$, while maintaining the concentrations of $H_2O$ and $CO_2$ to the extent possible in the feed gas to the reforming unit. Typically, $CH_4$ slip from the reformer unit is maintained below ~1.0-2.0%, and, as a result, similar to $CO/CO_2$ and $H_2/H_2O$, the $H_2/CH_4$ ratio in the reformed gas stream is high. While a high $CO/CO_2$ ratio in the reformed gas stream favors carbon deposition according to reactions (4) and (7) inside the reduction reactor, a high $H_2/CH_4$ ratio diminishes the chance of carbon deposition according to reactions (5) and (8). Thus, it is clear that by increasing the $CO/CO_2$ ratio, the carburization potential of the reformed gas improves. This is the main focus of the present invention.

BRIEF SUMMARY OF THE INVENTION

The present invention makes use of industrially available technologies, i.e. membrane modules (organic/inorganic/organometallic) by which a majority of the hydrogen and or $CO_2$ are recovered from a reformed gas stream in a plant via the rejection (i.e. separation) of other components. Such separation typically results in two different streams with distinct chemical compositions: one rich in CO and the other rich in $H_2$. The $H_2$-rich gas stream then blends with different gas streams in the process, including, but not limited to, the feed gas stream to the reformer unit, the cooling gas stream, the reducing gas stream, the fuel gas streams, etc. The CO-rich gas stream flows into the transition zone and/or the cooling zone of the reduction furnace to increase the carbon content of the sponge iron. The exothermic nature of reactions (4) and (7) permits the addition of more gas into the transition zone to keep the temperature high. Optionally, a hydrocarbon-rich gas stream is blended with the CO-rich gas stream prior to the final injection port.

Hundreds of membrane modules have been installed around the world by different vendors in oil refineries and petrochemical plants, where the recovery of hydrogen, the separation of $CO_2$, or the adjustment of the $H_2/CO$ ratio is important for the efficient operation of the plant. Thus, there is little impediment to employing such equipment in a novel manner in a DR plant.

The present invention is not limited to the use of membrane modules. All other separation/adsorption technologies (e.g. pressure/vacuum pressure/temperature swing adsorption (PSA/VPSA/TSA) units) meeting process requirements can be used to accomplish the carburization task of the present invention based on the guidelines presented.

In one exemplary embodiment, the present invention provides a method for producing direct reduced iron having increased carbon content, comprising: providing a reformed gas stream from a reformer; delivering the reformed gas stream to a carbon monoxide recovery unit to form a carbon monoxide-rich gas stream and a hydrogen-rich gas stream; and delivering the carbon monoxide-rich gas stream to a direct reduction furnace and exposing partially or completely reduced iron oxide to the carbon monoxide-rich gas stream to increase the carbon content of resulting direct reduced iron. The carbon monoxide-rich gas stream is delivered to one of a transition zone and a cooling zone of the direct reduction furnace. The reformed gas stream typically comprises 50.0-80.0% $H_2$, 20.0-40.0% CO, 1.0-5.0% $CO_2$, 0.0-3.0% $CH_4$, and 0.0-5.0% $N_2$, all dry bases, depending on the operating conditions of the reformer. The method further comprises cooling the reformed gas stream to less than its saturation temperature, preferably ambient temperature, e.g. 20-50 degrees C. in a cooler/chiller. The method further comprises compressing the reformed gas stream to a pressure of 5.0-20.0 barg, preferably 10.0-12.0 barg in a single or multi-stage compressor set before flowing into the CO recovery unit. In order to have a better efficiency, the carbon monoxide-rich gas stream should comprise more than 70.0% carbon monoxide, preferably between 80.0-90.0%. The hydrogen-rich gas stream comprises more than 70.0% hydrogen, preferably more than 80.0%. The method further comprises recycling the hydrogen-rich gas stream for use in a direct reduction plant for different potential applications, including, but not limited to, fuel for combustion applications, feed gas to the reformer, and reducing gas to the reduction furnace. In the case of using the hydrogen-rich stream as a fuel, it reduces the amount of $CO_2$ released to atmosphere. The method further comprises mixing the carbon monoxide-rich gas stream with a hydrocarbon-rich gas stream, preferably natural gas, to form the final carburizing gas.

The hydrocarbon-rich gas stream should comprise more than 90.0% hydrocarbon. Optionally, depending on the chemical composition of the hydrocarbon-rich gas stream, the method comprises one or more of a dehumidifier and a mist-eliminator/saturator for reducing the humidity of the hydrocarbon-rich gas stream to below 1.0%, and preferably dry it. Optionally, depending on the chemical composition of the hydrocarbon-rich gas stream, the method comprises one desulfurization step to drop the sulfur content of the hydrocarbon-rich stream to less than 100 ppm, preferably to less than 10 ppm. Optionally, depending on the mixing ratio between the hydrocarbon-rich stream and CO-rich stream, the system comprises a preheater for elevating the temperature of the final carburizing gas to a temperature of not more than 400 degrees C., preferably somewhere between 50 and 200 degrees C. The method further comprises injection of the final carburizing gas onto the bulk of the already reduced materials inside the reduction reactor.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

The present invention provides an efficient and cost effective process for increasing the carbon content of DRI in a reformer-based DR plant. It provides a carbon monoxide-rich stream with limited impurities that is directly injected into the bulk of hot and partially or completely reduced materials inside the reduction furnace, or first blended with other gases (e.g. a hydrocarbon-rich gas stream). The combination of coking reactions noticeably increases the carbon content of the resulting DRI, while keeping the temperature of the bulk high.

For a DR plant utilizing a reforming step, of any type, the following are the main advantages:

- The design is simple and straightforward with respect to engineering, construction, and operation.
- The conventional method of injecting a hydrocarbon-rich stream into the reduction furnace increases the carbon content of the material by endothermic hydrocarbon cracking reactions; hence lowering the material temperature. The present invention, however, boosts the carbon content of the iron via an exothermic reaction that keeps the reduction zone hot, yielding improved plant productivity. This is a plus for DR plants producing hot-discharged DRI.
- The process utilizes relatively little equipment.
- The process can be incorporated into either cold or hot-discharged DRI plants.
- Various vendors have already commercialized the individual components utilized, and their design and operation in other contexts are well documented.
- The required CAPEX and OPEX for the proposed system are reasonable.
- Integrating the present invention into existing DR plants does not affect the normal operation of such plants.
- The design can be added as a supplemental plug-in package for existing DR plants.
- There is no combustion/reaction associated with the design. Thus, its operation is quite safe and reliable.

Figure 1:
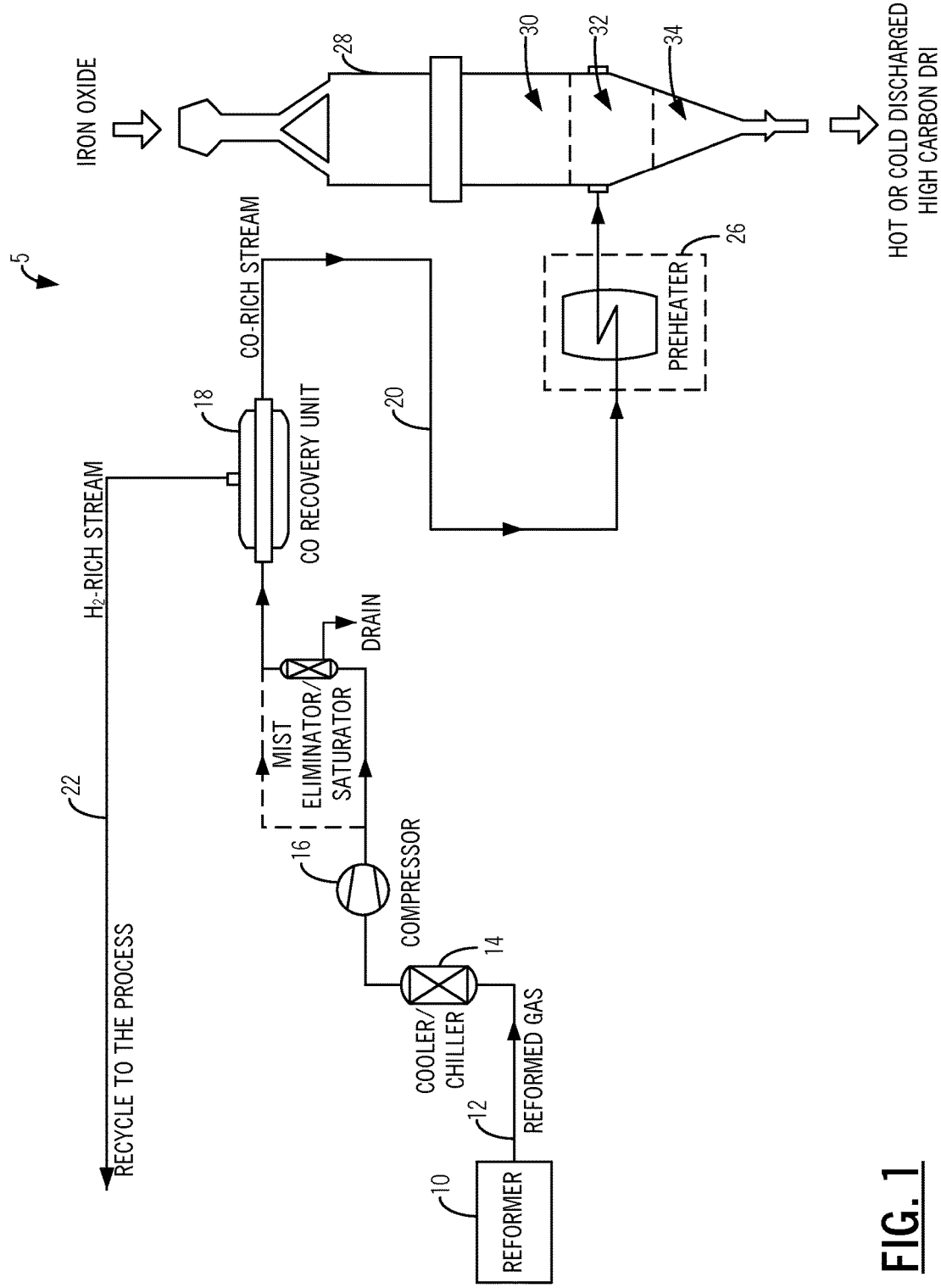
FIG. 1 is a schematic diagram illustrating one exemplary embodiment of the process for increasing the carbon content of sponge iron by injecting a carbon monoxide-rich stream into a reduction furnace of the present invention.

Referring now specifically to FIG. 1, in one exemplary embodiment, the process 5 of the present invention includes cooling at least a portion of the reformed gas derived from a reformer unit 10 (e.g. a tubular reformer, an autothermal reformer, a two-stage reformer, a combined reformer, a partial oxidation reformer, or any other reducing gas generating units capable of producing a CO-containing gas with a relatively high $CO/CO_2$ ratio) to close to ambient temperature (e.g. 30 degrees C.) using a cooler/chiller 14. Preferably, the reformed gas stream 12 contains at least 20.0% CO. The cooler/chiller 14 can utilize direct contact cooling, indirect contact cooling, refrigeration cooling, etc. During the cooling step, reformed gas will lose some of its water content, which in turn improves the carburization potential of the reformed gas. The cool/dry reformed gas optionally flows through a compressor 16 that boosts its pressure (to e.g. 12 barg), as most separation/adsorption methods works best at higher pressures. During the compression step, the gas loses even more water, resulting in further improved carburization potential.

The compressed gas, after optional temperature adjustment, flows into a system of membrane modules 18 for CO recovery. Any other kind of CO recovery mechanism can also be used for this step, like PSA/VPSA/TSA, refrigeration, etc. Following this step, the CO-rich gas stream 20 contains more than 70.0% CO, while the $H_2$-rich gas stream 22 contains more than 70.0% $H_2$.

The CO-rich gas stream 20 coming from the CO recovery unit 18 is optionally passed through a preheater 26, which heats it to 50-200 degrees C. The CO-rich gas stream 20 is then introduced into the DR furnace 28 below the primary reduction zone 30 (e.g. into the transition zone 32 and/or the cooling zone 34), where the CO-rich gas stream 20 comes into contact with partially or completely reduced iron oxide and deposits carbon based on the well known reactions $2CO \Leftrightarrow C+CO_2$ and $3Fe+2CO \Leftrightarrow Fe_3C+CO_2$. In general, the partially or completely reduced iron oxide in the transition zone 32 and/or the cooling zone 34 contains 0.5%-2.5% combined carbon before, and up to 4.0% combined carbon after the CO-rich stream addition.

Further, the rejected gas 22 from the CO recovery unit 18 (rich in $H_2$) can be used in different portions of the DR plant as fuel, cooling gas, syngas, or process gas, or it can be exported to another facility.

Figure 2:
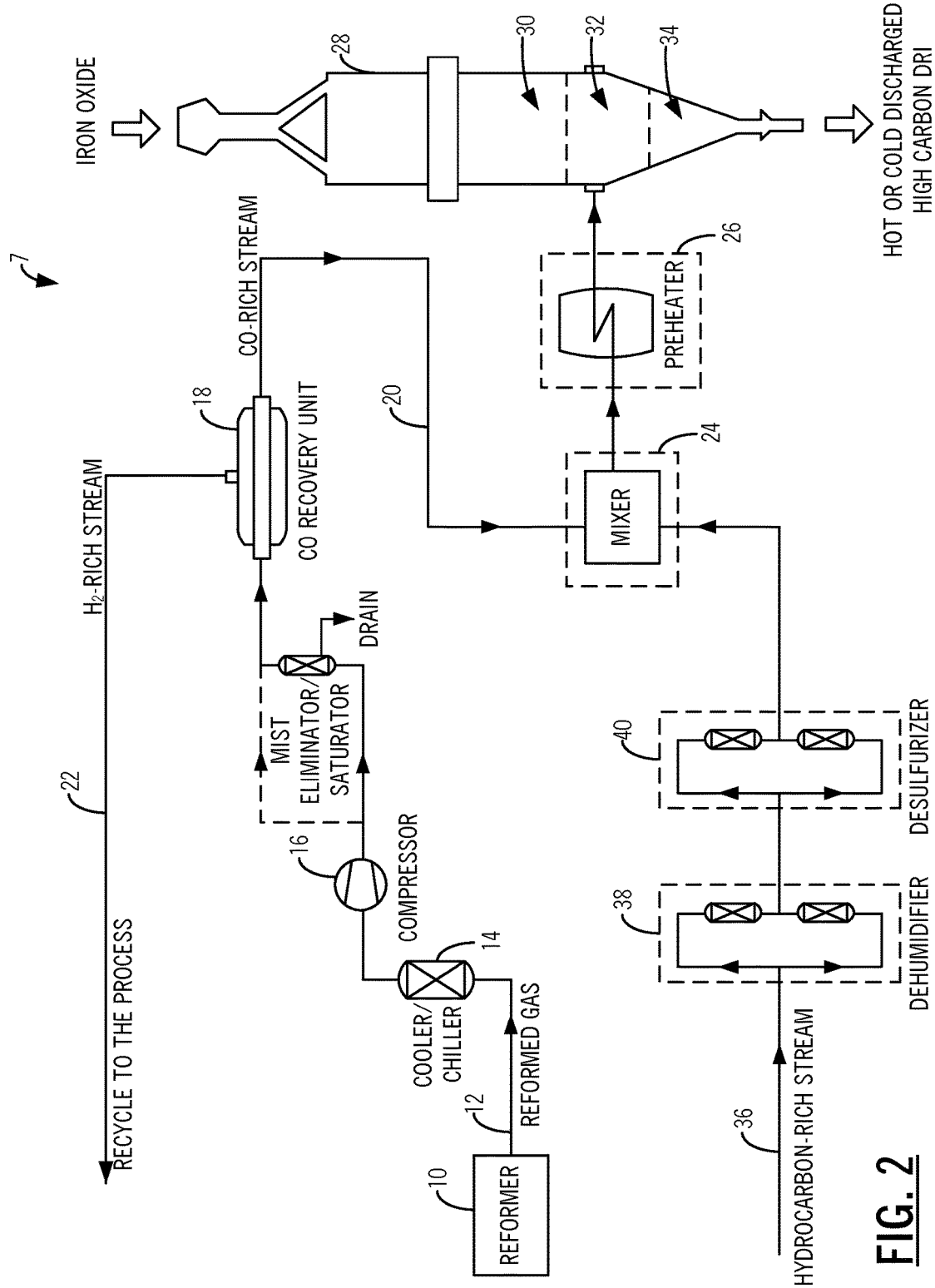
FIG. 2 is a schematic diagram illustrating another exemplary embodiment of the process for increasing the carbon content of sponge iron in a reduction furnace of the present invention, where a hydrocarbon-rich stream, with or without adjustment of its moisture and sulfur content, is blended with the carbon monoxide-rich stream of FIG. 1.

Referring to FIG. 2, in another exemplary embodiment the process 7 of the present invention includes cooling at least a portion of the reformed gas derived from a reformer unit 10 (e.g. a tubular reformer, an autothermal reformer, a two-stage reformer, a combined reformer, a partial oxidation reformer, or any other reducing gas generating unit capable of producing a CO-containing gas with a relatively high $CO/CO_2$ ratio) to close to ambient temperature (e.g. 30 degrees C.) using a cooler/chiller 14. Preferably, the reformed gas stream 12 contains at least 20.0% CO. The cooler/chiller 14 can utilize direct contact cooling, indirect contact cooling, refrigeration cooling, etc. During the cooling step, reformed gas will lose some of its water content, which in turn improves the carburization potential of the reformed gas. The cool/dry reformed gas optionally flows through a compressor 16 that boosts its pressure (to e.g. 12 barg), as most separation/adsorption methods works best at higher pressures. During the compression step, the gas loses even more water, resulting in further improved carburization potential.

The compressed gas, after optional temperature adjustment, flows into a system of membrane modules 18 for CO recovery. Any other kind of CO recovery mechanism can also be used for this step, like PSA/VPSA/TSA, refrigeration, etc. Following this step, the CO-rich gas stream 20 contains more than 70.0% CO, while the $H_2$-rich gas stream 22 contains more than 70.0% $H_2$.

The rejected gas 22 from the CO recovery unit 18 (rich in $H_2$) can be used in different portions of the DR plant as fuel, cooling gas, syngas, or process gas, or it can be exported to another facility.

Further, a hydrocarbon-rich gas stream 36 (natural gas, for example) is blended with the CO-rich gas stream 20 in a mixer 24 before both are introduced into the DR furnace 28. Optionally, if the hydrocarbon-rich stream is wet, one or more dehumidification units 38 can be used to make the gas dry for suppressing decarburization reactions. Optionally, if the hydrocarbon-rich stream is loaded with significant amount of sulfur compounds, one desulfurization unit 40 can be used to decrease and control the amount of total sulfur below 100 ppm, preferably, below 10 ppm, before flowing into the reduction furnace.

Thus again, the present invention makes use of industrially available technologies, i.e. membrane module units (organic/organic/organometallic) by which a majority of the hydrogen and or $CO_2$ are recovered from a reformed gas stream in a plant via the rejection (i.e. separation) of other components. Such separation typically results in two different streams with distinct chemical compositions: one rich in CO and the other rich in $H_2$. The $H_2$-rich gas stream then blends with different gas streams in the process, including, but not limited to, the feed gas stream to the reformer unit, the cooling gas stream, the reducing gas stream, the fuel gas stream, etc. The CO-rich gas stream flows into the transition zone and/or the cooling zone of the reduction furnace to increase the carbon content of the sponge iron. The exothermic nature of reactions (4) and (7) above permits the addition of more gas into the transition zone to keep the temperature high. Optionally, a hydrocarbon-rich gas stream is blended with the CO-rich gas stream prior to the final injection port.

Hundreds of membrane modules have been installed around the world by different vendors in oil refineries and petrochemical plants, where the recovery of hydrogen, the separation of $CO_2$, or the adjustment of the $H_2/CO$ ratio is important for the efficient operation of the plant. Thus, there is little impediment to employing such equipment in a novel manner in a DR plant.

The present invention is not limited to the use of membrane modules. All other separation/adsorption technologies (e.g. pressure/vacuum or pressure/temperature swing adsorption (PSA/VPSA/TSA) units) meeting process requirements can be used to accomplish the carburization task of the present invention based on the guidelines presented.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A system for producing direct reduced iron having increased carbon content, comprising:
    a direct reduction furnace for partially or completely reducing iron oxide to form partially or completely reduced iron oxide;
    a reformer for providing a reformed gas stream;
    a conduit for delivering the reformed gas stream to a carbon monoxide recovery unit to form a carbon monoxide-rich gas stream and a hydrogen-rich gas stream;
    a conduit for delivering a hydrocarbon-rich gas stream to a mixer, where it mixes with the carbon-monoxide-rich gas stream;
    a preheater disposed between the mixer and the direct reduction furnace for preheating the mixture of the carbon monoxide-rich gas stream and the hydrocarbon-rich gas; and
    a conduit for delivering the mixture of the carbon monoxide-rich gas stream and the hydrocarbon-rich gas stream to the direct reduction furnace and exposing the partially or completely reduced iron oxide to the mixture of the carbon monoxide-rich gas stream and the hydrocarbon-rich gas stream to increase the carbon content of resulting direct reduced iron, wherein the conduit for delivering the mixture of the carbon monoxide-rich gas stream and the hydrocarbon-rich gas stream to the direct reduction furnace is coupled to the direct reduction furnace corresponding to one or more of a transition zone and a cooling zone of the direct reduction furnace below a primary reduction zone of the direct reduction furnace, wherein the conduit for delivering the mixture of the carbon monoxide-rich gas stream and the hydrocarbon-rich gas stream to the direct reduction furnace is coupled to the direct reduction furnace at a point where the partially or completely reduced iron oxide in the one or more of the transition zone and the cooling zone of the direct reduction furnace contains 0.5-2.5% combined carbon before exposure to the mixture of the carbon monoxide-rich gas stream and the hydrocarbon-rich gas stream and up to 4.0% after.

2. The system of claim 1, wherein the reformed gas stream comprises 50.0-80.0% $H_2$, 20.0-40.0% CO, 1.0-5.0% $CO_2$, 0.0-3.0% $CH_4$, and 0.0-5.0% $N_2$, by volume.

3. The system of claim 1, further comprising a cooler/chiller for cooling the reformed gas stream to a temperature of 20-50 degrees C.

4. The system of claim 1, further comprising a compressor for compressing the reformed gas stream to a pressure of 5.0-20.0 barg.

5. The system of claim 1, wherein the carbon monoxide rich gas stream comprises at least 70% CO, by volume.

6. The system of claim 1, wherein the hydrogen-rich gas stream comprises at least 70.0% $H_2$, by volume.

7. The system of claim 1, further comprising a conduit for recycling the hydrogen-rich gas stream for use in a direct reduction plant.

8. The system of claim 1, further comprising one of a saturator and a dehumidifier for modifying the humidity of the reformed gas stream.

9. The system of claim 1, wherein the hydrocarbon-rich gas stream comprises at least 90.0% hydrocarbon, by volume.

10. The system of claim 1, further comprising a dehumidifier unit for lowering the humidity of the hydrocarbon-rich gas stream to below 1.0%, by volume.

11. The system of claim 1, further comprising a desulfurizer unit for lowering a total sulfur content of the hydrocarbon-rich gas stream to below 100 ppm.

12. The system of claim 1, wherein the preheater is operable for preheating the mixture of the carbon monoxide-rich gas stream and the hydrocarbon-rich gas stream to a temperature of up to 400 degrees C.

13. The system of claim 1, wherein the reformer comprises one of a tubular reformer, an autothermal reformer, a two-stage reformer, a combined reformer, and a partial oxidation reformer.

* * * * *